US011169504B2

(12) United States Patent
Radjou et al.

(10) Patent No.: US 11,169,504 B2
(45) Date of Patent: Nov. 9, 2021

(54) METHOD FOR FABRICATING A PHYSICAL SIMULATION DEVICE, SIMULATION DEVICE AND SIMULATION SYSTEM

(71) Applicant: BIOMODEX S.A.S., Paris (FR)

(72) Inventors: Sidarth Radjou, Plaisir (FR); Mayra Guadalupe Mora Espinosa, Paris (FR)

(73) Assignee: BIOMODEX, S.A.S., Paris (FR)

( * ) Notice: Subject to any disclaimer, the term of this patent is extended or adjusted under 35 U.S.C. 154(b) by 201 days.

(21) Appl. No.: 16/333,721

(22) PCT Filed: Sep. 19, 2016

(86) PCT No.: PCT/IB2016/001500
§ 371 (c)(1),
(2) Date: Mar. 15, 2019

(87) PCT Pub. No.: WO2018/051162
PCT Pub. Date: Mar. 22, 2018

(65) Prior Publication Data
US 2019/0271967 A1 Sep. 5, 2019

(51) Int. Cl.
G05B 19/4099 (2006.01)
G06F 30/23 (2020.01)
(Continued)

(52) U.S. Cl.
CPC ......... *G05B 19/4099* (2013.01); *G06F 30/23* (2020.01); *G09B 23/285* (2013.01);
(Continued)

(58) Field of Classification Search
CPC ...... G05B 19/4099; G05B 2219/49023; G09B 23/303; G09B 23/285; G09B 23/30;
(Continued)

(56) References Cited

U.S. PATENT DOCUMENTS 8,041,095 B2 10/2011 Mohamed et al.
8,565,909 B2 10/2013 Bickel et al.
(Continued)

OTHER PUBLICATIONS

Extended European Search Report received in EP Application No. 16189533.9, dated Apr. 13, 2017.
(Continued)

Primary Examiner — Michael J Brown
(74) Attorney, Agent, or Firm — Ray Quinney & Nebeker P.C.; Paul N. Taylor

(57) ABSTRACT

A method for fabricating a physical simulation device of an internal element of interest (9) located inside an object. The method comprises the steps of: receiving one non-destructive measurements of an imaged region, determining a three dimensional model of the imaged region (8) and materials of the object in locations of the three dimensional model, generating first and second volumetric models (18) from the three dimensional model, computing a deformed configuration of the first volumetric model under predefined loads and constraints on the basis of assigned intrinsic material properties, assigning to elementary volumetric elements of the second volumetric model (18) materials on the basis of the deformed configuration of the first volumetric model, fabricating a simulation device of the internal element of interest according to the second volumetric model (18) with the assigned materials.

20 Claims, 7 Drawing Sheets

(51) Int. Cl.
*G09B 23/30* (2006.01)
*G09B 23/28* (2006.01)
*G06F 111/04* (2020.01)
*G06F 111/10* (2020.01)
*G06F 119/18* (2020.01)

(52) U.S. Cl.
CPC ........... *G09B 23/30* (2013.01); *G09B 23/303* (2013.01); *G05B 2219/49023* (2013.01); *G06F 2111/04* (2020.01); *G06F 2111/10* (2020.01); *G06F 2119/18* (2020.01)

(58) Field of Classification Search
CPC .. G06F 30/23; G06F 2111/04; G06F 2111/10; G06F 2119/18
USPC .......................................................... 700/118
See application file for complete search history.

(56) References Cited

U.S. PATENT DOCUMENTS

| | | | |
|---|---|---|---|
| 9,042,613 B2 | 5/2015 | Spilker et al. | |
| 2011/0060446 A1* | 3/2011 | Ono | A61B 34/10 700/119 |
| 2012/0185218 A1 | 7/2012 | Bickel et al. | |
| 2012/0203266 A1 | 8/2012 | Mielekamp et al. | |
| 2013/0245801 A1 | 9/2013 | Schroeder | |
| 2014/0046469 A1 | 2/2014 | Bickel et al. | |
| 2014/0312535 A1 | 10/2014 | Dikovsky et al. | |
| 2014/0316748 A1 | 10/2014 | Bickel et al. | |
| 2015/0217520 A1 | 8/2015 | Karpas et al. | |
| 2016/0096318 A1 | 4/2016 | Bickel et al. | |
| 2016/0351079 A1* | 12/2016 | Legen | G09B 23/32 |

OTHER PUBLICATIONS

International Search Report and Written Opinion received in PCT Application No. PCT/IB2016/001500, dated May 19, 2017.
International Search Report and Written Opinion received in PCT Application No. PCT/EP2017/073621, dated Dec. 20, 2017.
International Preliminary Report on Patentability received in PCT Application No. PCT/EP2017/073621, dated Mar. 19, 2019.
Ellen Roche et al: "Design of an anatomically accurate, multi-material, patient-specific cardiac simulator with sensing and controls", Apr. 24, 2013, pp. 1-5.
Cloonan, et al (Mary Ann Liebert, Inc.): "3D-Printed Tissue-Mimicking Phantoms for Medical Imaging and Computational Validation Applications", Jan. 1, 2014.
Skouras, et. al., "Computational design of actuated deformable characters", ACM Transactions on Graphics (106), vol. 32, No. 4, Jul. 1, 2013, pp. 1, 82:2, 82:5, 82:6.
Xu, et. al., "Interactive Material Design Using Model Reduction", ACM Transactions on Graphics (106), vol. 34, No. 2, Mar. 2, 2015, pp. 18:4, 18:6, 18:7.

* cited by examiner

METHOD FOR FABRICATING A PHYSICAL SIMULATION DEVICE, SIMULATION DEVICE AND SIMULATION SYSTEM

CROSS REFERENCE TO RELATED APPLICATIONS

This application is a national stage application under 35 U.S.C. 371 of PCT Application No. PCT/IB2016/001500, having an international filing date of 19 Sep. 2016, which designated the United States, the entire disclosure of which is incorporated herein by reference in its entirety.

FIELD OF THE INVENTION

The instant invention relates to physical simulation devices able to simulate the mechanical behavior of an object.

The invention also relates to the fabrication of such physical simulation devices, in particular to the fabrication of multi-materials simulation devices.

BACKGROUND OF THE INVENTION

The invention is in particular concerned with physical simulation devices able to simulate the mechanical behavior of a complex object such as an heterogeneous object or an homogeneous object with complex mechanical behavior that are difficult to reproduce in a manufactured object without relying on a combination of several base material.

Among other fields, the invention can find applications in surgical training and medical device development and testing.

In its most immediate sense, the invention relates to training surgeons to perform operations using physical simulation devices of living tissues.

Historically, medical students have been trained through apprenticeships mainly offered in hospital settings. Residents performed surgery under the supervision of more experienced surgeons. The type of situations presented to the surgeon trainee was largely driven by chance as the nature and timing of situations needing surgery found in patients was not under anyone's control. This model of using a stream of situations as presented by clinical service of human patients thus does not provide a reliable model for repetition until mastery.

In addition or as alternative to apprenticeship, student and surgeons thus often practice their skills on biologic simulators which comprise live animal organs and human cadaver organs.

Live animals include for instance canine, porcine, or bovine specimens. Like resident surgeries, they offer the possibility of performing surgery in in-vivo environments. However, animal models suffer from a whole range of problems, including the many deviations between human and animal anatomy and physiology, the confounding effects of variation between individual animals, and the unpredictability that arises from using a model that is extraordinarily complex. Moreover, specialized and expensive facilities are usually required to source the animals and additional considerations such as animal welfare put strong constrains on the use of animal as models for training surgeons.

An alternative is to use dead organs from human cadaver that have been re-animated using hydraulics, reperfusion, and computer orchestration, and are then placed in a human equivalent model for instance as described in WO2012/0510533, U.S. Pat. No. 7,7910,1015, 6,336,1012, or 5,951, 301. While cadaver tissues provide an accurate representation of anatomical geometry, the required chemical preservation greatly alters the local physical parameters of the tissues and the biological temperatures and flows are often not adequately simulated. Moreover, subjects are difficult to source and maintain in useful quantities.

Similar issues are raised during the development of any new medical device where various tests are required by official agencies for the certification of the device, usually involving an analysis of the interaction between the device and human or animal tissues.

To overcome these issues, alternate simulating devices have been designed which mainly involve:
 medical simulators which involve simulating a surgery procedure on a computer provided with haptic feedback interfaces resembling those of real surgical procedures, for example a catheter-like input unit, and
 benchtop devices physically reproducing an organ.

Computer simulations are limited by the assumptions made in their derivation and the computational power of the computer which pose significant constraints on the simulated geometries and, as a consequence, on the type of surgical operation that can be simulated (in practice, restricted to endoscopic surgery). An example of such a computer simulation can be found in European Pat. App. No. 2 899 711.

The present invention finds one application in with regards to the latest category of simulating devices: benchtop devices physically reproducing living tissues.

Historically, benchtop simulation devices have been fabricated by molding and assembling elements made in engineering materials such as plaster, silicon of plastic.

While these traditional models can provide rather accurate representation of anatomical geometry, their physical properties are usually not representative of actual use conditions and as such, they cannot provide reliable models for biologic tissues.

More recently, benchtop simulation devices have been disclosed in which specially designed materials were developed having mechanical behavior closer to the biomechanical properties of the living tissues.

Examples of such designed materials mimicking bones, muscles and tendon tissues are given in US Pat. App. No. 2007/0166670, or U.S. Pat. No. 8,388,351.

These benchtop simulation devices still show a number of shortcomings that limit their usefulness.

First, the elements made from these specially designed materials still have to be independently fabricated and then assembled together to build a simulation device. Such a process put a limit on the minimal size for each element since the body organs can be as small as a few tens of microns wide.

Such a process also results in a rather long fabrication time. As a consequence, the benchtop simulation devices have to be made according to a standard design and cannot be personalized to train a surgeon on a specific operation to be conducted on a specific patient.

Moreover, the biomechanical behavior of a small part of a living body is strongly tied to its surroundings and to the neighboring organs. For instance, the deformation of an aorta under the pressure of a surgical stent being placed in an artery (as part of an endovascular aorta repair for instance) is strongly influenced by the presence of the rachis bone in proximity of the aorta. Another example is the mechanical deformation of a wrist tendon being pulled on during a fractured wrist operation which is influenced by the entire length of the tendon.

As a consequence, realistic benchtop simulation devices have to reproduce a large portion of the body surrounding the region of interest and to include a great number of elements in order to provide realistic biomechanical properties. Cost, duration and difficulty of fabrication are thus increased.

An alternative approach is illustrated in US Pat. App. No. 2014/0312535 which discloses a system and a method for reconstructing a body part from volumetric measurements. In such a method a base material is associated to each voxel value of the measurement (for instance density information of a CT scan or H atom concentration of a MRI acquisition) and a simulation device is manufactured from the resulting combination of materials.

Unfortunately, various part of the body can present similar densities or H atom concentrations but not share the same mechanical behavior.

Moreover, as with previously described benchtop simulation devices, a realistic reconstructed body part would have to reproduce a large portion of the body surrounding the region of interest to provide realistic biomechanical properties which increases again the cost, duration and difficulty of fabrication.

The present invention aims at mitigating these drawbacks among other advantages.

More generally, the present invention aims at providing methods and apparatus that would better train medical practitioners to perform operations and would allow for better testing and development of medical devices. The present invention also aims at providing methods and apparatus that allow for personalized simulation of a specific operation to be conducted on a specific patient.

Apart from the medical testing and medical training fields, the present invention can find application in any field where a physical device reproducing the mechanical behavior of an internal element of interest located inside an object has to be fabricated in a non-invasive or minimally invasive manner.

SUMMARY OF THE INVENTION

To this aim, a first object of the invention is a method for fabricating a physical simulation device of an internal element of interest located inside an object, the method comprising at least the steps of:

receiving at least one nondestructive measurement of an imaged region located inside an object, said imaged region comprising an internal element of interest of the object, determining, from said at least one nondestructive measurement, a three dimensional model of the imaged region and at least one object material class indicator representative of a material of the object in at least one location of the three dimensional model, generating a first volumetric model and a second volumetric model from said three dimensional model, said first and second volumetric models being respectively divided in a plurality of elementary volumetric elements, assigning to each elementary volumetric element of the first volumetric model intrinsic material properties selected in a database of intrinsic material properties on the basis of the object material class indicator determined from said at least one nondestructive measurement, computing a deformed configuration of the first volumetric model under a first set of predefined loads and constraints on the basis of said assigned intrinsic material properties, assigning to at least one elementary volumetric element of the second volumetric model a material selected in a database of simulation materials, on the basis of the deformed configuration of the first volumetric model, fabricating a simulation device of the internal element of interest according to the second volumetric model with said assigned materials.

In some embodiments, one might also use one or more of the following features:

the step of assigning a material to each elementary volumetric element of the second volumetric model comprise the operation of:

defining a combination of materials from the database of simulation materials respectively associated to each elementary volumetric element of the second volumetric mesh, computing a deformed configuration of the second volumetric model under the a second set of predefined loads and constraints, each elementary volumetric element of the second volumetric model has been assigned intrinsic material properties associated to the material defined for said elementary volumetric element, computing a displacement error function between the deformed configuration of the second volumetric model and the deformed configuration of the first volumetric model, updating the combination of materials on the basis of the displacement error function until a convergence criterion is met;

computing the displacement error function between the deformed configuration of the second volumetric model and the deformed configuration of the first volumetric model comprise computing a distance between at least one elementary volumetric element of the second volumetric model and at least one associated elementary volumetric element of the first volumetric model;

the first volumetric model is divided into:

an internal element region modeling the internal element of interest of the object, and a surrounding region modeling an additional portion of the object surrounding the internal element;

the second volumetric model comprises a device region modeling an operational part of the simulation device;

the second volumetric model is divided into:

said device region modeling an operational part of the simulation device, a support region modeling a physical support of the simulation device, and, optionally, an intermediate region between the device region and the support region modeling a device interface of the simulation device;

each elementary volumetric element of the device region of the second volumetric model is respectively associated with at least one elementary volumetric element of the internal element region of the first volumetric model, and each elementary volumetric element of the device region the second volumetric model is assigned a material selected in a database of simulation materials, on the basis of the deformed configuration of the internal element region of the first volumetric model;

the displacement error function is computed between the deformed configuration of the internal element region of the first volumetric model and the deformed configuration of the device region of the second volumetric model;

the material assigned to each elementary volumetric element of the support region is predefined and remain the same during the operation of the method;

the simulation device is fabricated based on the device region of the second volumetric model, optionally together with the intermediate region of the second volumetric model;

the step of fabricating the simulation device is performed at least in part by additive manufacturing of the second volumetric model with said assigned materials;

the database of simulation materials comprises a plurality of 3D printed materials and, optionally, additional nonprintable materials such as water, gels, metals, ions, ceramics, biomolecules and the like;

the three dimensional model of the imaged region comprises at least one surface mesh representative of an object interface of the internal element of the object, in particular an interface of the object associated to a discontinuity in the physical properties of the object;

the first volumetric model is generated from said three dimensional surface mesh by performing a finite element volumetric model generation;

the second set of predefined loads and constraints comprises a load on said object interface of the object;

the object is a living tissue;

an object material class indicator representative of a material of the living tissue in a location of the three dimensional model is determined by:

performing a topological segmentation of the measurement to label an organ of the living tissue comprising said location of the three dimensional model, determining said object material class indicator on the basis of said organ label, additionally provided metadata on the living tissue and, optionally, a local physical parameter of the living tissue at said location obtained by the at least one nondestructive measurement, in particular said additionally provided metadata comprise an age and a sex of a user to which said living tissue belong;

the intrinsic material properties selected on the basis of the object material class indicator are nonlinear viscoelasticity functions modeling biomechanical behaviors of living tissues;

the method is noninvasive or minimally invasive;

assigning to at least one elementary volumetric element of the second volumetric model a material selected in a database of simulation materials comprises at least the following steps:

a) defining a cluster of elementary volumetric elements of the second volumetric model, b) selecting a cluster object material in the database of object materials by minimizing a cost function of said cluster determined by computing at least one deformed configuration of the second volumetric model under a second set of predefined loads and constraints at least one elementary volumetric element of said cluster has been assigned intrinsic material properties associated to a material of the database of object materials, c) partitioning the elementary volumetric elements of said cluster in at least two subclusters based on the deformed configuration of said cluster, d) repeating at least once step b) for each of said at least two subclusters, and generating a 3D model for fabricating an object from the second volumetric model and the materials assigned to each elementary volumetric element of the second volumetric model;

said cost function is a function of a deformed configuration of the cluster and the deformed configuration of the first volumetric model;

step b) comprises an operation b1) of computing a deformed configuration cost function of the second volumetric model, associated to at least one material of the database of object materials, said operation b1) comprising:

b1-1) assigning to each elementary volumetric element of said cluster identical intrinsic material properties associated to said material, b1-2) determining a deformed configuration of the second volumetric model under the second set of predefined loads and constraints, b1-3) computing a cost function of said cluster associated to said material, said cost function being a function of a strain error between the deformed configuration of said cluster and the deformed configuration of the first volumetric model;

said operation b1) of computing a deformed configuration cost function of the second volumetric model is performed for each material of a subset of M materials of the database of object materials, and step b) further comprises an operation b2) of selecting a cluster object material in the database of object materials by comparing the cost functions computed for each material in said subset of materials of the database of object materials;

an ordered subset of M materials of the database of object materials is associated to a cluster of the second volumetric model, and the materials of said ordered subset are ordered according to a physical property of said materials, in particular according to a stiffness of said materials.

said operation b1) of computing a deformed configuration cost function of the second volumetric model is performed for a preselected material in the ordered subset of M materials of the database of object materials, and step b) further comprises the operations of:

b2) comparing a function of said cost function to a termination criterion to determine whether said preselected material can be selected as the cluster object material, b3-1) if said preselected material can be selected as the cluster object material perform step c), b3-2) if said preselected material cannot be selected as the cluster object material, preselecting another material in said subset of M materials of the database of object materials by comparing said cost function to a direction criterion and reiterate at least once operations b1) through b3-1), b3-2);

each elementary volumetric element of the cluster of the second volumetric model is respectively associated with at least one elementary volumetric element of the first volumetric model;

step c) comprises an operation c1) of comparing a location of at least one elementary volumetric element in the deformed configuration of the cluster with a location of at least one elementary volumetric element in the deformed configuration of the first volumetric model;

the step of partitioning the elementary volumetric elements of the cluster in at least two subclusters comprises an operation c2) of determining, for each subcluster of said at least two subclusters, a subset of materials of the database of object materials associated to said subcluster on the basis of the deformed configuration of the cluster;

steps b) and c) are repeated until each subclusters comprise a single elementary volumetric element;

steps b) and c) are repeated until a difference between the deformed configuration of the second volumetric model and the deformed configuration of the first volumetric model of the object satisfy a convergence criterion.

Another object of the invention is a simulation device specially intended to reproduce at least a mechanical behavior of an organ or a part of an organ inside a living tissue under a set of predefined loads and constraints, said organ or a part of an organ being located inside a living tissue and surrounded by an additional portion of the living tissue, the simulation device reproduces a topology of said organ or part of an organ but not a topology of said additional portion of the living tissue, the materials of the simulation device are such that, a deformed configuration of the simulation device under said set of predefined loads and constraints is similar to a deformed configuration of the organ or part of an organ surrounded by said additional portion of the living tissue under said set of predefined loads and constraints.

In some embodiments, one might also use one or more of the following features:

the simulation device is produced by:

receiving at least one nondestructive measurement of an imaged region located inside a living tissues, said imaged region comprising an organ or a part of an organ of the living tissues, determining, from said at least one nondestructive measurement, a three dimensional model of the imaged region and at least one object material class indicator representative of a material of the object in at least one location of the three dimensional model, generating a first volumetric model and a second volumetric model from said three dimensional model, said first and second volumetric models being respectively divided in a plurality of elementary volumetric elements, the first volumetric model being divided into:

an internal element region modeling the internal element of interest of the object, and a surrounding region modeling an additional portion of the object surrounding the internal element, the second volumetric model comprising a device region modeling an operational part of the simulation device, each elementary volumetric element of the device region of the second volumetric model being respectively associated with at least one elementary volumetric element of the internal element region of the first volumetric model, assigning to each elementary volumetric element of the first volumetric model intrinsic material properties selected in a database of intrinsic material properties on the basis of the object material class indicator determined from said at least one nondestructive measurement, computing a deformed configuration of the first volumetric model under a first set of predefined loads and constraints on the basis of said assigned intrinsic material properties, assigning to at least one elementary volumetric element of the device region of the second volumetric model a material selected in a database of simulation materials, on the basis of the deformed configuration of the internal element region of the first volumetric model, fabricating the simulation device of the internal element of interest according to the second volumetric model with said assigned materials;

the materials of the simulation device comprises at least two different 3D printed materials and, optionally, additional non-polymerizable materials such as water, gels, metals, ions, ceramics, biomolecules and the like.

Yet another object of the invention is a simulation system of an internal element of interest comprising:

a physical support with at least one slot, a simulation device of an internal element of interest as detailed above, able to be inserted in said at least one slot of the physical support, the materials of the simulation device are such that, a deformed configuration of the simulation device inserted in said at least one slot of the physical support under said set of predefined loads and constraints is similar to a deformed configuration of the organ or part of an organ surrounded by said additional portion of the living tissue under said set of predefined loads and constraints.

Yet another object of the invention is an apparatus for fabricating a physical simulation device of an internal element of interest located inside an object, the apparatus comprising:

a communication unit operative to receive at least one nondestructive measurement of an imaged region located inside an object, said imaged region comprising an internal element of interest of the object, a memory unit operative to store a database of intrinsic material properties and a database of simulation materials, a processing unit operative to determine, from said at least one nondestructive measurement, a three dimensional model of the imaged region and at least one object material class indicator representative of a material of the object in at least one location of the three dimensional model, generate a first volumetric model and a second volumetric model from said three dimensional model, said first and second volumetric models being respectively divided in a plurality of elementary volumetric elements, assign to each elementary volumetric element of the first volumetric model intrinsic material properties selected in the database of intrinsic material properties on the basis of the object material class indicator determined from said at least one nondestructive measurement, compute a deformed configuration of the first volumetric model under a set of predefined loads and constraints on the basis of said assigned intrinsic material properties, assign to at least one elementary volumetric element of the second volumetric model a material selected in the database of simulation materials, on the basis of the deformed configuration of the first volumetric model, and a fabrication unit operative to fabricate a simulation device of the internal element of interest according to the second volumetric model with said assigned materials.

BRIEF DESCRIPTION OF THE DRAWINGS

Other characteristics and advantages of the invention will readily appear from the following description of several of its embodiments, provided as non-limitative examples, and of the accompanying drawings.

On the drawings.

On the different figures, the same reference signs designate like or similar elements.

DETAILED DESCRIPTION

Figure 7:
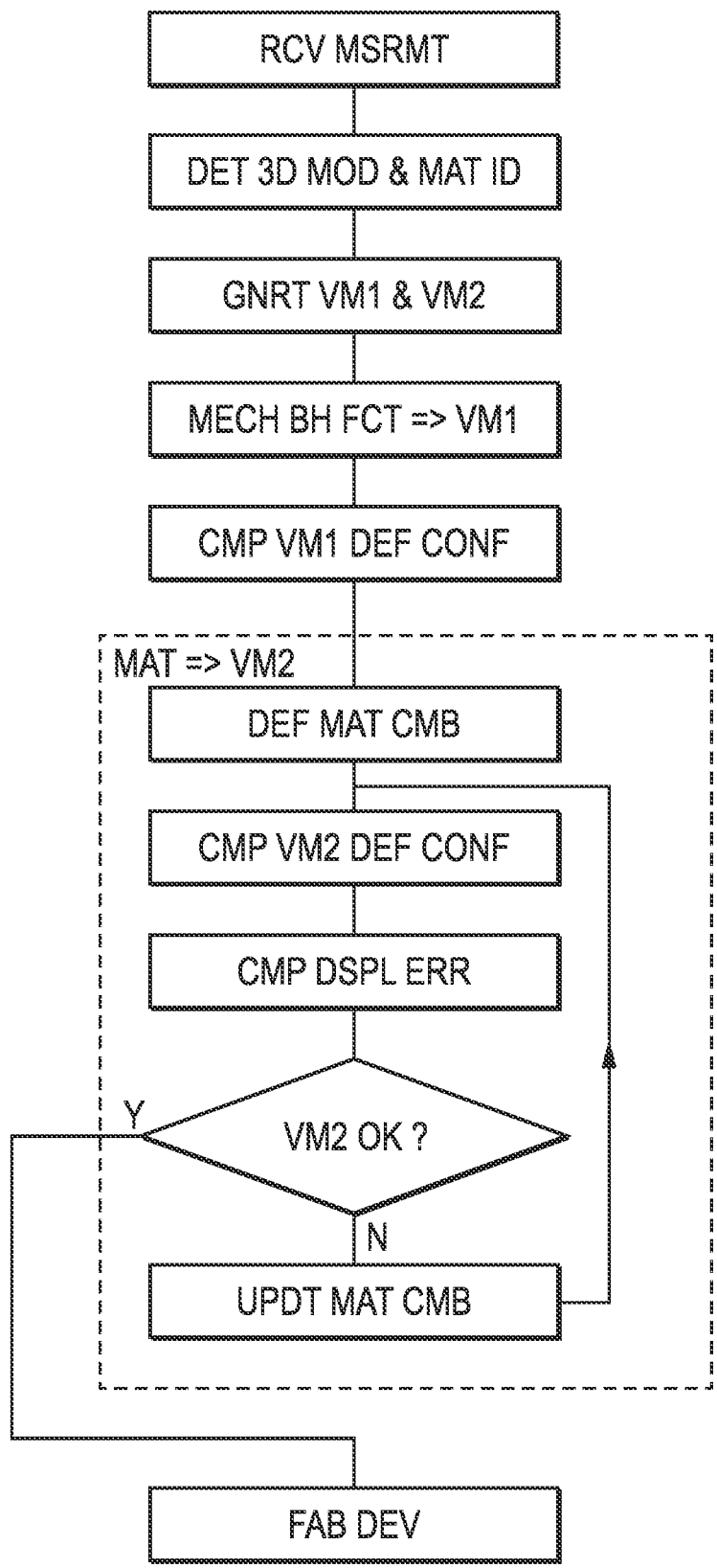
FIG. 7 is a flowchart illustrating a method according to an embodiment of the invention.

FIG. 7 illustrates a method for fabricating a physical simulation device 2 of an internal element of interest 9 located inside an object 7 according to a first embodiment of the invention.

The object 7 can be in particular an heterogeneous object. In one non-limitative example, the object 7 comprises living tissue. In one example, the object 7 can be a human or animal body or a portion of a human or animal body.

The internal element of interest 9 is a portion of the human or animal body.

The internal element of interest 9 is located inside the object 7.

By "the internal element of interest is located inside the object", it is meant that the internal element is at least partly buried inside the object 7, in particular totally enclosed inside the object 7. As a consequence, the mechanical properties of the internal element cannot be fully assert by contact measurements, for instance by stress-strain measurements.

By "mechanical properties" and "biomechanical properties", it is meant for instance uni-axial or multi-axial tensile strength or modulus, uni-axial or multi-axial compressive strength or modulus, shear strength or modulus, coefficient of static or dynamic friction, surface tension, elasticity.

A first step of the method is illustrated on FIG. 7 and comprises receiving at least one non-invasive or minimally invasive measurement of an imaged region 8 located inside the object 7.

Said at least one non-invasive or minimally invasive measurement may be performed in a preliminary step of a method according to the invention.

By "minimally invasive measurement", it is understood a measurement performed in a minimally invasive procedure, for instance by where images of the body are obtained by way of catheters.

The imaged region is a three-dimensional bounded region of the object. An example of imaged region is illustrated on FIG. 1 and includes the internal element of interest 9 of the object 7. The imaged region 8 also includes an additional portion 10 of the object 7 surrounding the internal element of interest 9 as illustrated on FIG. 1.

By "an additional portion of the object surrounding the internal element of interest", it is understood that the internal element of interest 9 does not constitute the totality of the object 7 and that the object 7 extends beyond the internal element.

The additional portion 10 is in contact with the internal element and at least partially surrounding said internal element, in particular the additional portion 10 may totally surrounds the internal element.

The main difference between the internal element and the additional portion 10 lie in the fact that only the internal element will be topologically reproduced by the simulation device 2 but the mechanical behavior of the combined system {internal element+additional portion 10} will be reproduced by the simulation device 2.

The partition of the object 7 (in particular of the imaged region 8 of the object 7) between the internal element and the additional region thus allows to physically reproduce only a restricted portion of the object and thus to reduce the cost of the simulation device 2 and the complexity of the fabrication process.

In the example of biologic tissues, the additional portion typically comprises tissues, bones and joints that may exert a significant mechanical feedback on the internal element when the tissues of the internal element are under mechanical stress. The mechanical interaction between tissues of the additional portion and tissues of internal element, at a given location of the object, is very specific; the extension of the additional portion is thus specifically defined for each simulation device 2. A preliminary mechanical or biomechanical study may be used to define a standard imaged region 8 for a given application, for instance carotid simulation devices 2.

Figure 2A:
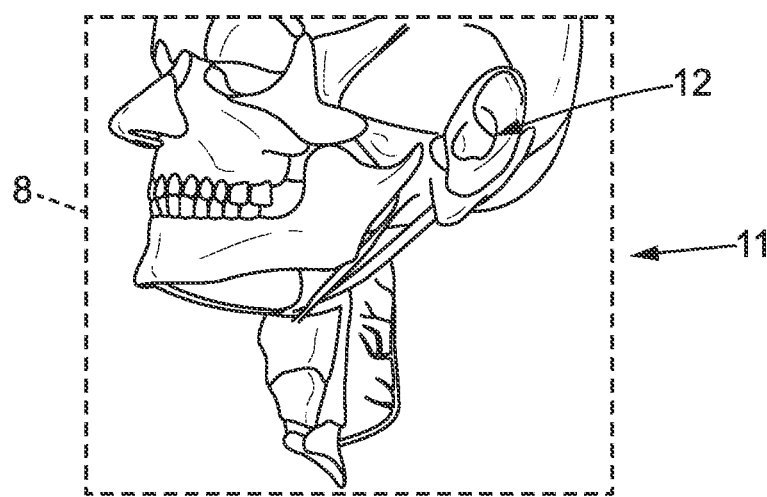
FIG. 2A illustrates an example of three dimensional model of an imaged region in the case of the fabrication of a simulation device for simulating a coronary angioplasty procedure, FIGS. 2B and 2C respectively illustrate a first volumetric model and a second volumetric model generated from a three dimensional model.

FIG. 2A shows an example of three dimensional model of an imaged region 8 in the case of the fabrication of a simulation device 2 for simulating a carotidian angioplasty procedure.

In this case, the internal element is constituted by tissues of the carotid artery on the surgery operation area while the additional portion 10 comprise tissues of the carotid artery located outside the surgery area and tissues which are not part of the artery and may apply a significant mechanical feedback on the tissues of the carotid artery when the tissues of the artery are undergoing mechanical stress (for instance the rachis bone).

By "a non-destructive measurement of an imaged region 8 located inside the object 7" it is mean a measurement of a local physical parameter of a region located inside the object 7 without damaging said object. The measurement may be performed in a non-invasive manner or may involve minimally invasive method, such as for instance an endoscopic measurement.

The measurement may in particular involve the use of penetrating wave to measure said local physical parameter. Such nondestructive imaging methods are known in the field of medical imaging and comprise for instance Radiography, Magnetic Resonance Imaging (MRI), Ultrasound, Elastography, Tactile imaging, Photoacoustic imaging, Thermography, Echocardiography, Functional near-infrared spectroscopy, Tomography, Computer-assisted Tomography such as X-ray computed tomography, Positron emission tomography or Magnetic resonance imaging and Nuclear medicine such as Scintigraphy or Single-photon emission computed tomography for instance.

A second step of the process then involve determining, from said at least one non-destructive measurement, a three dimensional model 11 of the imaged region 8 and at least one object material class indicator representative of a material of the object 7 in at least one location of the three dimensional model 11.

To this aim, several non-destructive measurements may be combined together to result in said three dimensional model 11 of the imaged region 8.

In one non-limitative example involving tomographic imaging, a plurality of slices (for e.g. tomographic images) may thus be acquired forming a stack of cross section of the object in the imaged region 8 of the object. Each slice comprises information relating to a local physical parameter of the object in the imaged region 8 along said cross section of the imaged region 8. For instance, in the case of a CT scan, the local physical parameter obtain by the non-destructive measurement is the density of the tissue area. In the case of a magnetic resonance imaging, the local physical parameter is the density of hydrogen molecules.

A three dimensional model 11 of the imaged region 8 may then be reconstructed by a known reconstruction algorithm, for instance based on an inverse radon transform.

The three dimensional model 11 of the imaged region 8 may comprise for example a set of three-dimensional pixels, commonly referred as "voxel" (short for "volumetric pixel") juxtaposed with one another along the three dimensions. A scalar or vector field representative of the local physical parameter in a voxel is associated to every voxel. The scalar field is for example a mean density inside a voxel.

An object material class indicator representative of a material of the living tissue in a location of the three dimensional model 11 can then be determined.

In one embodiment of the invention, the object material class indicator can be determined directly from the scalar or vector field representative of the local physical parameter in a voxel is associated to every voxel, for instance, from a Young Modulus measured by elastography measurements.

In another embodiment of the invention, the object material class indicator can be determined as follows.

First, a topological segmentation of the measurement is performed in order to label an organ of the living tissue in the three dimensional model 11.

This operation may be automatically performed by an image processing algorithm adapted to identify clusters of three-dimensional pixels according to predefined criteria on the basis of:
  the local physical parameter associated to each voxel (minimal density, density with regard to the neighboring voxels), and
  constrains on the geometric properties of the voxel clusters (for example a minimal size or a specific shape of an organ).

The organ labelling operation is an important operation and has to be performed on an extended region. Indeed, voxels belonging to different organ or tissues may show the same local physical parameters on a measurement (for instance the same density) but possess totally differing mechanical properties.

This operation allows labeling cluster of three-dimensional pixels belonging to a specific organ of interest or a specific portion of an organ.

As a matter of non-limitative example, the organ label may indicate that an identified cluster of voxel belongs to a "bone" or to a "muscle", or to a specific part of a bone for instance a "cortical bone" or a "trabecular bone".

In a subsequent operation, an object material class indicator is determined for at least on location in the imaged region 8.

The object material class indicator is an indicator of the expected mechanical behavior of the internal region at a location in the imaged region 8.

The object material class indicator is determined on the basis of at least one of
  the organ label assigned to the cluster of voxels containing said location,
  additionally provided metadata on the living tissue and
  a local physical parameter of the living tissue at said location obtained by the at least one measurement.

For instance, the local physical parameter of the living tissue at said location may be a Young modulus of the living tissue at said location obtained by elastography measurements.

The additionally provided metadata may comprise for instance the age and sex of a user to which said living tissue belong. The local physical parameter of the living tissue is obtained from the non-destructive measurement and can be used to finely tune the object material class indicator.

In particular, an object material class indicator may be determined for a plurality of locations in the imaged region 8, in order to map the expected mechanical behavior over the entire imaged region 8.

As a matter of non-limitative example, the object material class indicator may thus indicate that a specific location in the imager region belong to a "cortical bone" of a mid-aged man. As such, an expected mechanical behavior of the object at said location can be estimated.

More precisely, each object material class indicator is associated with intrinsic material properties. The intrinsic material properties are gathered in a database of intrinsic material properties.

The database of intrinsic material properties is predefined and can be built by using mechanical measurements published by scientists and/or can be built or completed by performing additional mechanical tests.

The intrinsic material properties comprise functions modeling the physical behavior of a material. For instance the intrinsic material properties can include a density of a material, Young Modulus, Poisson ratio, thermal conductivity, electric conductivity. The intrinsic material properties may also take into account non-linear effects in the material. The intrinsic material properties may comprise nonlinear elasticity functions. In the specific example of living tissues, the intrinsic material properties may further comprise non-linear viscoelasticity functions able to realistically model the biomechanical behaviors of living tissues, for instance as detailed in "Mechanical Properties of Brain Tissue in-vivo: Experiment and Computer Simulation" by Miller, K. et al., published in J. Biomech. vol. 33 (2000) p. 1369-1376.

During this step, a surface mesh 12 of the internal element of interest 9 may also be determined during the topological segmentation of the measurement.

In one embodiment, a surface reconstruction process—for example a "marching cubes" method—may be implemented to build a three-dimensional surface mesh 12 for an organ or a portion of an organ labeled by the topological segmentation operation.

By "surface mesh 12" it is meant a three-dimensional surface which delimits a boundary of a cluster of voxel identified during the topological segmentation operation. The three-dimensional surface may be a CAD model or a polygon mesh and may be tessellated or defined by a set of equations. The surface mesh 12 may be closed or open.

The surface mesh may in particular be representative of an object interface of the object 7 being an interface associated to a discontinuity in the physical properties of the object, for instance a discontinuity of the mechanical properties inside the object.

In one particular embodiment of the invention, the surface mesh is an object interface of the internal element of the object 7. The internal element of the object 7 may for instance be an organ or a portion of an organ inside a body and the surface mesh 12 may be an interface of said organ.

By "interface of an organ", it is meant a boundary of said organ.

Several surface mesh 12es may be determined for each organ or organ portion identified in the imaged region 8.

Surface mesh 12es may be part of the three dimensional model 11 of the imaged region 8.

Figure 2B:
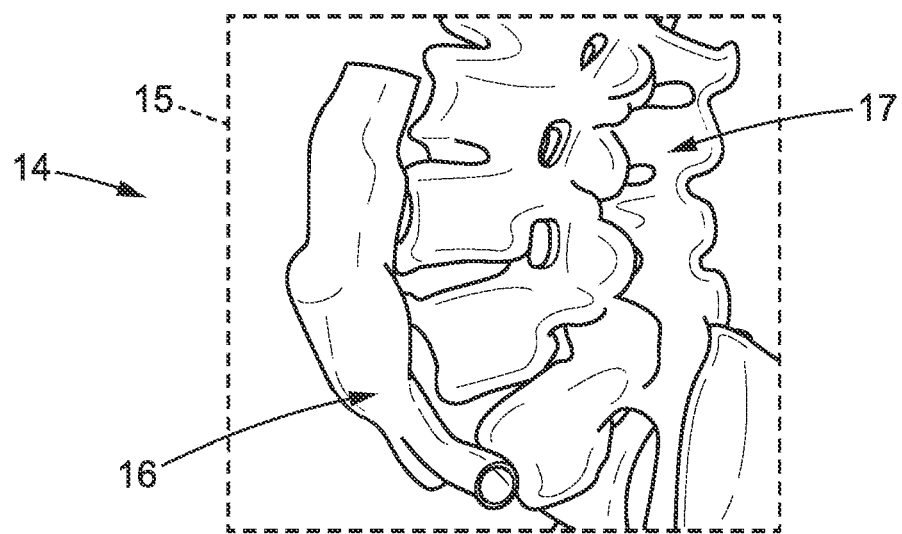
Figure 2C:
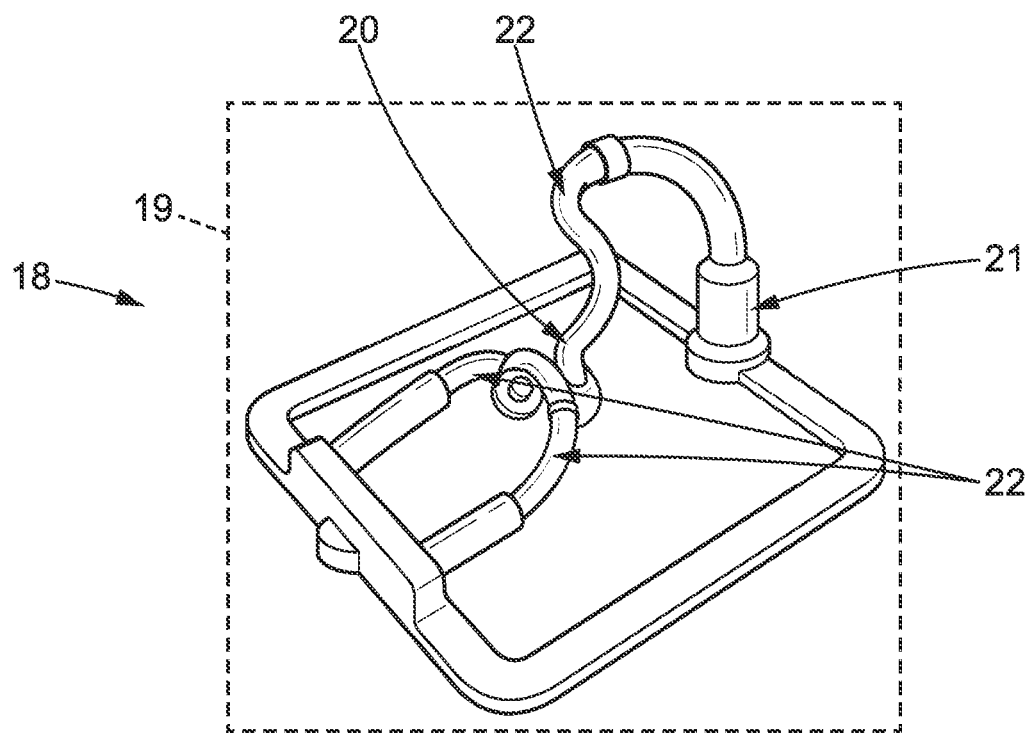

In a third step of the method, a first volumetric model and a second volumetric model 18 are generated from the three dimensional model 11 and are respectively illustrated on FIGS. 2B and 2C.

The first volumetric model 14 and a second volumetric model 18 are both three-dimensional set of nodes which define a plurality of elementary volumetric elements respectively dividing a first space region 15 modeled by the first volumetric model 14 and a second space region 19 modeled by the second volumetric model 18.

The three-dimensional set of nodes and the elementary volumetric elements of the first volumetric model 14 and the second volumetric model 18 are defined in order to be able to perform a three-dimensional finite element simulation of the deformations of the first volumetric model 14 and the second volumetric model 18.

The elementary volumetric elements are thus in particular selected among the shapes of tetrahedron, pyramid, triangular prism and hexahedron. In particular, tetrahedrons may be selected as elementary volumetric elements.

The first volumetric model 14 and the second volumetric model 18 may in particular comprise unstructured grid, i.e. tessellation of the first and second space regions 19 in an irregular pattern.

This way, the first volumetric model 14 and the second volumetric model 18 may be adapted to present a refined structure where deformations of the mesh are potentially more significant on a smaller scale.

In one embodiment, the first volumetric model 14 and the second volumetric model 18 may be generated directly from the set of three-dimensional pixels of the three dimensional model 11 of the imaged region 8.

In another embodiment, the first volumetric model 14 and the second volumetric model 18 may be generated from the three dimensional surface mesh 12 by performing a finite-element volumetric model generation, for example by using a software such as "Abacus"® by Dassault System Inc.

In one embodiment of the invention, the first volumetric model 14 is divided into:
- an internal element region 16 modeling the internal element of interest 9 of the object 7, and
- a surrounding region 17 modeling an additional portion 10 of the object 7 surrounding the internal element.

The internal element region 16 and the surrounding region 17 may be connected and form a single mesh, or boundary conditions may be defined between the internal element region 16 and the surrounding region 17 in order to simulate the load transfer and mechanical forces between these two regions.

The second volumetric model 18 may be divided into:
- a device region 20 modeling an operational part 3 of the simulation device,
- a support region 21 modeling a physical support 5 of the simulation device 2,
- and, optionally, an intermediate region between the device region 20 and the support region 21 modeling an device interface 4 of the simulation device 2.

Here also, the device region 20, the support region 21 and, optionally, the intermediate region may be connected and form a single mesh, or boundary conditions may be defined between said regions in order to simulate the load transfer and mechanical forces between these regions.

The operational part 3 of the simulation device 2 is a portion of the simulation device 2 whose mechanical behavior is intended to be as close as possible to the mechanical behavior of the internal element of the object.

The operational part 3 of the simulation device 2 may for instance correspond to a part of a body physically manipulated by a surgeon during a surgery operation.

The internal element region of the first volumetric model and the device region 20 of the second volumetric model are thus intended to model identical topology: the topology of the internal element of the object.

In one embodiment, the topological configurations of the internal element region of the first volumetric model and the device region 20 of the second volumetric model may be identical (in initial configurations of said regions).

Alternatively, one of the first volumetric model and the second volumetric model may be more refined than the other so that a one-to-one correspondence between the nodes of the internal element region of the first volumetric model and the nodes of the device region 20 of the second volumetric model may not be drafted but a correspondence between each node of a model and clusters of the other model may still be defined.

In general, each elementary volumetric element of the device region 20 of the second volumetric model may thus be respectively associated with at least one elementary volumetric element of the internal element region of the first volumetric model. In some embodiment, an elementary volumetric element of the device region 20 of the second volumetric model may be associated with several elementary volumetric element of the internal element region of the first volumetric model by performing an interpolation between said elements.

One the contrary, the surrounding region of the first volumetric model may show no topological correspondence with the support region 21 and intermediate region of the second volumetric model.

Indeed, the surrounding region 17 of the first volumetric model 14 intends to model the additional portion 10 of the object 7 that surrounds the internal element inside the object.

One the other hand, the support region 21 aims at modeling a physical support 5 of a simulation system according to the invention as detailed further below.

The physical support 5 is provided with at least one slot 6 where the simulation device 2 can be inserted.

Said slot 6 can have any shape and dimension as long as it is adapted to accommodate one or several portion of the simulation device 2 in order to secure the simulation device 2.

The physical support 5 is not fabricated during the fabrication step of the present method and does not have to reproduce the mechanical behavior of the surroundings of the internal element. In a non-limitative example, the physical support 5 is made of a plastic molded or casted in a mold. The physical support 5 made be more rigid than the object 7 for instance.

The intermediate region represents a device interface 4 of the simulation device 2 which is a portion of the simulation device 2 in contact with the physical support 5.

The device interface 4 may also not reproduce exactly the mechanical behavior of the surroundings of the internal element and is intended to provide an interface between the mechanical behavior of the operational part 3 of the simulation device 2 and the mechanical behavior of the physical support 5.

The topology of the surrounding region, the support region 21 and the intermediate region are thus only loosely related at most.

During this step, the second volumetric model may be further adapted to take into account various constrains related to the fabrication process.

Such adaptation can involve a simplification of the topology to ensure a reliable or possible manufacturing. Among the manufacturing constraints are: setting a minimum wall thickness, preventing undercut molding, taking into account the minimal droplet size of the three-dimensional printing process (about 16 microns diameter). Additional constraints are related to cleaning the support material after the 3D printing. One or more constraints from the following list can thus be taken into account:
- a minimum size of the elementary volumetric element, for example each element must contain a cube of dimension 16 µm*16 µm*16 µm, corresponding to a minimum size of polymerized drops;
- a geometric parameter relating to the minimum distance g between two points of the polyhedron, for example by ensuring that $g > a*g$, where $g = \min_{(A,B) \text{ belonging to element}} |(xA,yA,zA)-(xB,yB,zB)|$ and a is a predefined scalar.

In a following step, a plurality of intrinsic material properties are selected in a database of intrinsic material properties on the basis of the at least one object material class indicator and are assigned to each elementary volumetric element of the first volumetric model 14 determined as detailed above.

A deformed configuration of the first volumetric model 14 under a first set of predefined loads and constraints can then be computed on the basis of said assigned intrinsic material properties.

By "a set of predefined loads and constraints", it is meant the effect of the surrounding environment on the model. The predefined loads and constraints may thus comprise loads which may be mechanical such as volumetric forces (gravity), surfacic forces (loads, pressure), ponctual forces (moment, . . . ), thermic such as thermal load, or electric or magnetic such as concentrated charge. The predefined loads and constraints may also comprise boundary conditions which may also be mechanical such as encastrement, displacement/rotation, velocity, general contact, self-contact but also thermal or fluidic such as temperature, acoustic pressure and electric potential. The predefined loads and constraints may also comprise global environmental effects such as temperature field and pressure field (scalar or vector field).

A first set of predefined loads and constraints and a second set of predefined loads and constraints may be defined and respectively associated to the first volumetric model 14 and to the second volumetric model 18.

In some embodiments of the invention, the sets of predefined loads and constraints respectively associated to the first volumetric model 14 and to the second volumetric model 18 may be identical.

In other embodiments, the sets of predefined loads and constraints associated to the first volumetric model 14 may depart from the set of predefined loads and constraints associated to the second volumetric model 18, for instance by incorporating additional physical phenomenon such as gravity and/or ignoring some phenomenon.

The first set of predefined loads and constraints associated to the first volumetric model 14 may depart from the second set of predefined loads and constraints associated to the second volumetric model 18.

Indeed, the temperature, pressure, interaction with external organs usually differ between the internal element of interest (modeled by the first volumetric model) and the simulation device (modeled by the second volumetric model). For instance, the second set of loads and constraints may include an environmental temperature field at room temperature while the first set of loads and constraints may include an environmental temperature field at a body temperature, for instance 37° Celsius.

The sets of predefined loads and constraints may thus be also different between the first volumetric model 14 and the second volumetric model 18.

In one non-limitative example of application, the set of predefined loads and constraints associated to the first volumetric model 14 and to the second volumetric model 18 may be representatives of surgical mechanical forces that are exerted on the tissues of the internal element during a predefined surgical operation. For example, the set of predefined loads and constraints may then comprise an external stress field σ defined to correspond to the stress field exerted by a neuroradiologist introducing a catheter in a carotid artery, and deploying a stent in the artery. The set of predefined loads and constraints may include additional force field such as surrounding organs stress field and/or blood pressure.

In such a case, the predefined loads and constraints will be similar to the stress field applied on the inner surface of the carotid artery and for example directed along the outer local normal at each point of the inner surface of the carotid artery with a magnitude similar to the magnitude of a force exerted by a stent, typically between 10 and 100 kPa.

By a "configuration of a volumetric model", it is meant three-dimensional locations of the nodes which defines the plurality of elementary volumetric elements partitioning the space region modeled by the volumetric model.

The deformed configuration of the first volumetric model 14 may be defined with regards to an initial configuration of the first volumetric model 14 without the set of predefined loads and constraints.

The deformed configuration of the first volumetric model 14 is computed by performing a numerical simulation of the deformation of the first volumetric model 14 under the first set of predefined loads and constraints, for instance a finite elements method, discrete element method, combined finite element-discrete element method or the like.

The first set of predefined loads and constraints corresponds to constraints applied on the first volumetric model.

In one example of particular interest, the first set of predefined loads and constraints is representative of surgical mechanical forces that are exerted on the tissues of the internal element during a predefined surgical operation.

For example, the first set of predefined loads and constraints may comprise an external stress field σ defined to correspond to the stress field exerted by a neuroradiologist introducing a catheter in a carotid artery, and deploying a stent in the artery.

In such a case, the predefined loads and constraints will:
- be similar to the stress field applied on the inner surface of the carotid artery;
- be directed along the outer local normal at each point of the inner surface of the carotid artery;
- have an magnitude similar to the magnitude of a force exerted by a stent, typically between 10 and 100 kPa.

The predefined loads and constraints may thus in particular be a load applied on an object interface of the internal element inside the object 7.

From the first set of predefined loads and constraints and the intrinsic material properties assigned to each elementary volumetric element of the first volumetric model, it is possible to compute a deformed configuration of the first volumetric model as realistic as possible.

By "a deformed configuration as realistic as possible", it is meant that the deformed configuration of the first volumetric model 14 under the first set of predefined loads and constraints is similar or very close to the real physical deformation of the internal element under a real stress field associated to the first set of predefined loads and constraints. The degree to which the deformed configuration of the first volumetric model 14 approximates the real physical deformation of the internal element depends for an significant part on the accuracy of the intrinsic material properties.

The intrinsic material properties are thus measured or taken from the state of the art in order to model as accurately as possible the mechanical properties of real tissues. As mentioned above, the intrinsic material properties may model elastic, hyperelastic hyperfoam, hypoelastic, viscoelastic material, among other.

Figure 3:
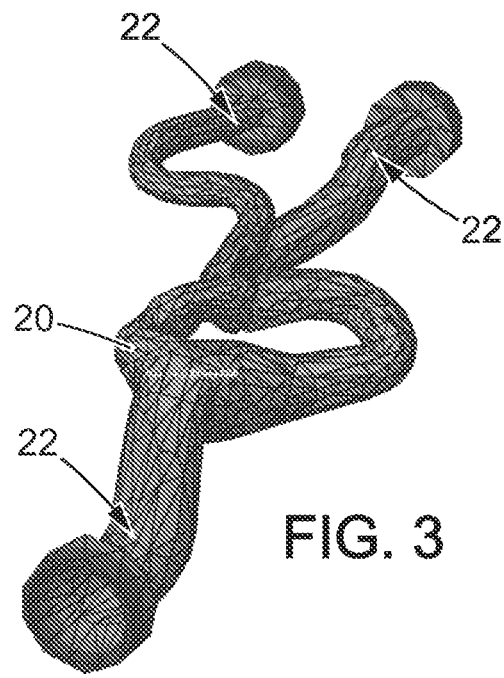
FIG. 3 illustrates a second volumetric model with assigned materials according to a step of a method according to the invention.

Once the deformed configuration of the first volumetric model have been computed, a step of assigning a material selected in a database of simulation materials to at least one elementary volumetric element of the second volumetric model may be performed as illustrated on FIG. 3.

Figure 4A:
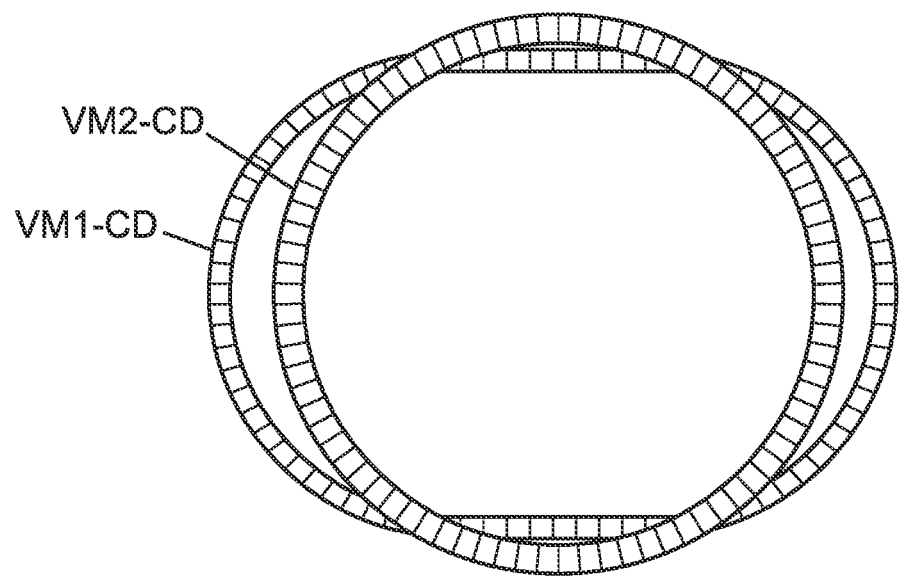
FIG. 4A to 4C illustrates details operations of a step of assigning a material to each elementary volumetric element of the second volumetric of FIG. 3.
Figure 4B:
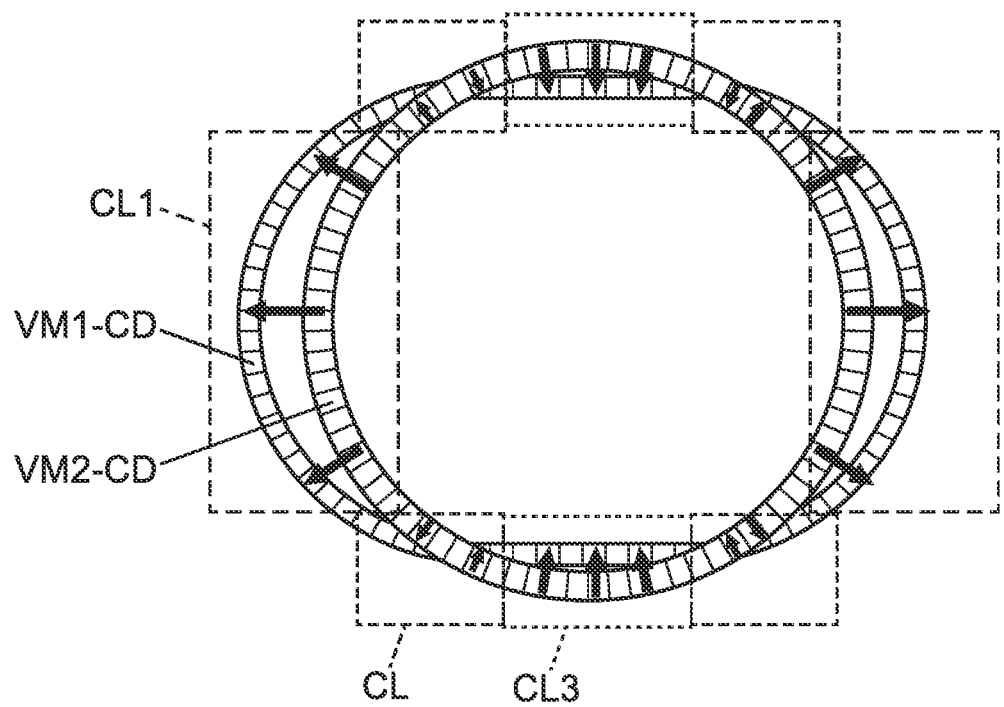
Figure 4C:
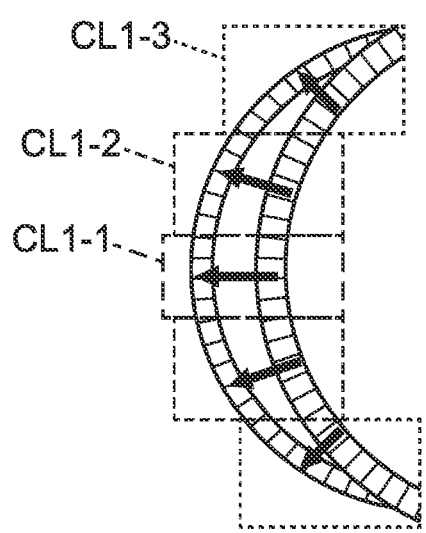

An example of embodiment of this step comprises the following general steps that are illustrated on FIGS. 4A to 4C. However, other possibilities can be envisaged to perform this operation.

In the example of FIGS. 4A to 4C, the step of assigning a material comprise the following operations:

a) defining a cluster of elementary volumetric elements of the second volumetric model, b) selecting a cluster object material in the database of object materials by minimizing a cost function of said cluster determined by computing at least one deformed configuration of the second volumetric model under the first set of predefined loads and constraints wherein at least one elementary volumetric element of said cluster has been assigned intrinsic material properties associated to a material of the database of object materials, c) partitioning the elementary volumetric elements of said cluster in at least two sub-clusters based on the deformed configuration of said cluster, d) repeating at least once step b) for each of said at least two sub-clusters.

These general steps will now be described in more details.

During step a), a cluster of elementary volumetric elements of the second volumetric model is defined.

When step a) is performed for the first time during the method, the cluster of elementary volumetric elements may comprise the totality of the elementary volumetric elements of the second volumetric model.

As the method proceeds, the cluster may comprise a smaller and smaller number of elementary volumetric elements until it reaches a single elementary volumetric element as it will become apparent from the following description of the method.

An object material is then selected in the database of object materials for the cluster. The selection of the object material for the cluster is obtained as the results of minimizing a cost function of the cluster.

This cost function is a function of the deformed configuration of the first volumetric model and a deformed configuration of the cluster detailed further below and illustrated on FIG. 4A.

The cost function is for instance a function of a strain error between the deformed configuration of the cluster and the deformed configuration of the first volumetric model.

The strain error may in particular be written as $\varepsilon_i^M - \varepsilon_i^T$ where $\varepsilon_i^M$ is a strain of an elementary volumetric element i of the cluster between an initial configuration of the second volumetric model without the predefined loads and constraints and a deformed configuration of the cluster under the predefined loads and constraints and $\varepsilon_i^T$ is a displacement of an elementary volumetric element i of the first volumetric model between the initial configuration of the first volumetric model and the deformed configuration of the first volumetric model.

Alternatively, the cost functions may be function of strain, stress, reaction force and the like . . . .

Several cost functions may be used depending on the progress of the method and/or the size of the cluster.

A first example of a suitable cost function Jg can be written as:

$$Jg = \sqrt{\frac{1}{n}\sum_{i=1}^{n}(\varepsilon_i^M - \varepsilon_i^T)^2} \quad (1)$$

where n is the number of elementary volumetric elements in the cluster and $\varepsilon_i^M - \varepsilon_i^T$ is the strain error between the deformed configuration of the cluster and the deformed configuration of the first volumetric model. This cost function (1) is always positive.

Another example of cost function $J_{Cl}$ is:

$$J_{Cl} = \frac{1}{n}\sum_{i=1}^{n}(\varepsilon_i^M - \varepsilon_i^T) \quad (2)$$

where n is the number of elementary volumetric elements in the cluster and $\varepsilon_i^M - \varepsilon_i^T$ is the strain error between the deformed configuration of the cluster and the deformed configuration of the first volumetric model. This cost function (2) can be positive or negative.

Yet another example of a suitable cost function $J_i$, specifically adapted for a cluster containing only a single elementary volumetric element is:

$$J_i = \frac{\varepsilon_i^M - \varepsilon_i^T}{\varepsilon_i^T} \quad (3)$$

where $\varepsilon_i^M - \varepsilon_i^T$ is the strain error between the deformed configuration of the cluster and the deformed configuration of the first volumetric model. This cost function (3) can be positive or negative.

A selected cost function (1)-(3) is computed during an operation b1) which is illustrated in greater detail on FIG. 2 and comprises a first sub-operation of b1-1) assigning to each elementary volumetric element of said cluster identical intrinsic material properties associated to a selected material.

The object material may be then selected in a predefined subset of M materials of the database of object materials.

Method for defining said subset of M materials and for selecting the object material in said subset of M materials are detailed further below.

Then, during a sub-operation b1-2) a deformed configuration VM2-CD of the second volumetric model under the second set of predefined loads and constraints is determined as illustrated on FIG. 4A.

The deformed configuration of the second volumetric model may be determined by performing a finite element simulation of the deformation of the second volumetric model under the second set of predefined loads and constraints.

Once the deformed configuration of the second volumetric model has been determined, the cost function of the cluster associated to said material can be computed b1-3). The cost function is for instance computed from the selected equation (1)-(3) detailed above.

In a first embodiment of the invention, operation b1) is performed for each material of a subset of M materials of the database of object materials.

Each material of the subset of M materials of the database of object materials is thus successively selected, assigned to every elementary volume element of the cluster, the deformed configuration of the second volumetric model is determined and the associated cost function is computed.

Once a cost function has been associated to each material of the subset of M materials, a cluster object material can be selected (operation b2) in the database of object materials by comparing the cost functions and selecting the object material associated to the lowest cost function for instance.

In another embodiment of the invention, the subset of M materials of the database of object materials can be ordered according to a physical property of said materials.

For instance, the materials in the subset can be ordered based on their stiffness, from the softest to the hardest, for instance according to a multi-axial tensile modulus.

In this embodiment, step b) may be performed as follows:

A first material may be pre-selected in the ordered subset of M materials of the database of object materials, for instance a material associated to a median or mean physical property of the materials of the ordered subset.

Then, a first deformed configuration cost function may be computed b1) for said pre-selected material.

Then, a function of the computed cost function, for instance an absolute difference between the computed cost function and a previously computed cost function, is compared to a termination criterion in an operation b2). The termination criterion is for instance a maximal difference threshold.

If said function of the computed cost function satisfies the termination criterion the pre-selected material can be selected as the cluster object material in an operation b3-1).

The function of the computed cost function satisfies the termination criterion, another material is pre-selected in the subset of M materials.

To this aim, the cost function is compared to a direction criterion, for instance a direction threshold and another material of the ordered subset is selected on the basis of the result of said comparison.

An example is illustrated on FIGS. 4B and 4C.

In this example the cost function is computed according to equation (2) which can get positive and negative values. The direction criterion is a comparison with the threshold value 0.

If the cost function is negative, the deformation of the cluster was too small with regard to the target deformation, the material is thus updated to the next softer material of the subset of M materials.

If the cost function is positive, the deformation of the cluster was too high with regard to the target deformation, the material is thus updated to the next stiffer material of the subset of M materials.

Operations b1) through b3) can then be reiterated until the termination criterion is met.

The terminal criterion is important to ensure that the algorithm can terminate and don't stay locked oscillating between two materials.

Indeed, since the materials shows a discrete range of physical properties, the difference between the deformed configuration of the second volumetric model and the deformed configuration can usually not be reduced to zero.

A remaining error thus has to be accepted and is encoded in the termination criterion.

The termination criterion may also take into account cases when an extremity of the range of physical property of the subset of material is reached.

When the cluster object material has been selected, the method can move on to step c).

During step c), the elementary volumetric elements of the cluster are partitioned in at least two sub-clusters based on the deformed configuration of the cluster.

To this aim a location of each elementary volumetric element in the deformed configuration of the cluster may be compared with a location of the associated elementary volumetric element in the deformed configuration of the first volumetric model (operation c1).

A number of sub-clusters can be defined to classify the results of these comparisons as illustrated on FIGS. 4B and 4C.

As a matter of non-limitative example, three sub-clusters CL1, CL2, CL3 are defined in the example of FIG. 4B as follows:

sub-cluster CL3 comprises the elementary volumetric elements which are displaced too much in the deformed configuration of the second volumetric model with regard to the deformed configuration, sub-cluster CL1 comprises the elementary volumetric elements which are not displaced enough in the deformed configuration of the second volumetric model with regard to the deformed configuration, and sub-cluster CL2 comprises the elementary volumetric elements which can be considered as being within an acceptable distance of the deformed configuration.

Of course, more or less sub-clusters may be defined in order to partition more finely or more roughly the cluster.

In addition, or in variant, the partitioning operation may take into account other properties relating to the deformed configuration of the cluster.

An example of higher order property is for instance the normal direction of each elementary volume element with regard to the normal direction of the associated element in the deformed configuration.

During this step, a subset of materials of the database of object materials may be associated (operation c2) to each sub-cluster on the basis of the deformed configuration of the cluster.

As a matter of example, let's define the database of materials as containing m materials referenced as Mat_1, . . . , Mat_m and ordered according to a measure of the stiffness of said materials as detailed above.

In this example, we assume that material Mat_k with $1 \leq k \leq m$ was selected during step b). Sub-cluster A, which comprises the elementary volumetric elements that are displaced too much in the deformed configuration of the second volumetric model, can then be associated with a subset of harder materials of the material database, for instance the subset Mat_k, ..., Mat_m. Sub-cluster B, which comprises the elementary volumetric elements that are not displaced enough in the deformed configuration of the second volumetric model, can be associated with a subset of softer materials of the material database, for instance the subset Mat_1, ..., Mat_k. Sub-cluster C comprises the elementary volumetric elements that are considered to have an acceptable behavior and whose selected material can thus stay identical. The subset associated to sub-cluster C can thus be restricted to Mat_k.

Other ways to associate a subset of material to a given sub-cluster can be defined, for instance by selecting overlapping ranges of materials.

It is understood that, during the first occurrence of step b) in the method, the cluster may comprise the entire second volumetric model. The subset of materials associated to this cluster may then comprise the whole range of material of the database.

Once the elementary volumetric elements of the cluster have been partitioned, steps b) and c) of the method can be repeated for each sub-cluster of the partition.

The method can then involve a recursive computation on smaller and smaller cluster until each sub-clusters comprise a single elementary volumetric element.

On example is illustrated on FIG. 4C on which sub-cluster CL1 is again divided in three sub-clusters CL1-1, CL1-2, CL1-3.

Alternatively or in addition, steps b) and c) of the method can be repeated until a difference between the deformed configuration of the second volumetric model and the deformed configuration of the first volumetric model of the object satisfy a convergence criterion.

For instance, a general cost function of the deformed configuration of the entire second volumetric model (for example based on equation 1) may be computed and compared to a convergence criterion, for instance a threshold on the maximum error over the whole second volumetric model.

If the convergence criterion is met, the reiteration of steps b) and c) can be stopped.

Then, a 3D surface model for fabricating the object may be generated from the second volumetric model and the materials assigned to each elementary volumetric element of the second volumetric model.

The 3D model may for example comprise a plurality of 3D files such as STL files (file format native to the stereolithography CAD software created by 3D Systems, Rock Hill, S.C.). Each file may be associated to a single material of the plurality of material printable by a 3D printer.

The 3D surface model may be used for manufacturing the object.

Eventually, a final step of the process according to the invention is the fabrication of the simulation device 2 of the internal element of interest 9.

The simulation device 2 is manufactured on the basis of the second volumetric model 18 and said assigned materials.

More precisely, the simulation device is fabricated based on the device region 20 of the second volumetric model, optionally together with the intermediate region of the second volumetric model.

The fabrication of the simulation device 2 may be performed at least in part by additive manufacturing in particular by 3D printing.

It is understood by those of ordinary skill in the art that the final mechanical interface can be manufactured using both traditional and state-of-the-art methods including, but not limited to, casting, 3D printing, mechanical linkages of separate materials and shape deposition manufacturing.

Additional non-printable materials such as water, gels, metals, ions, ceramics, bio-molecules and the like may be used and may be deposited using various techniques encompassing casting, 3D printing, mechanical linkages of separate materials and shape deposition manufacturing.

In particular, materials emulating cholesterol may be used.

To perform the fabrication step, one or several raster file may be created from the second volumetric model 18, in particular by grouping elementary volumetric elements with identical assigned materials in separate files.

The raster files are then transmitted to a multi-material additive manufacturing device in which the simulation device is printed, usually one layer at a time.

In some embodiments, the elementary volumetric elements may be replicated with a plurality of printed layers, e.g. 5-20 printing layers.

According to some embodiment of the present invention, multi-material additive manufacturing device is equipped with several building materials, in particular at least two building materials, each having different mechanical properties as detailed above.

Optionally, the multi-material additive manufacturing device may be equipped to dispense the additional material, e.g. non-printable materials such as water, gels, metals, ions, ceramics, bio-molecules and the like.

In one embodiment of the present invention, advanced 3D printing technology may be used that enable seamless integration of various materials in the simulation device 2. For instance, Stratasys, Ltd. (North America, 7665 Commerce Way Eden Prairie, Minn. 55344. Phone: +1 952-937-3000 Fax: +1 952-937-0070) produces advanced 3D printers using PolyJet Matrix™ Technology that enables a plurality of material durometers to be simultaneously jetted in the production of the same mechanical device, allowing for spatially varying viscoelastic properties within the simulation device 2.

With a 16-micron, high-resolution print layer, high dots-per-inch in both X and Y resolution, and an easy-to-remove support material property, this technology allows to develop simulation device 2 with mechanical properties that are adjusted at the scale of the living tissues.

Figure 5:
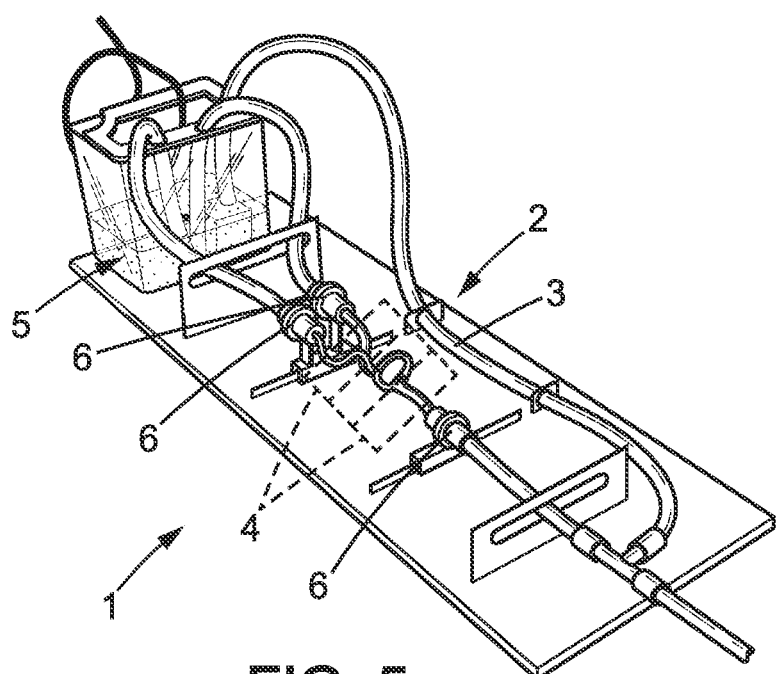
FIG. 5 illustrates a simulation device according to an embodiment of the invention.

Another object of the invention is a simulation device 2 fabricated according to one embodiment of a method of the invention detailed above and illustrated on FIG. 5, wherein the internal element of interest 9 is located inside a living tissue and surrounded by an additional portion 10 of the living tissue.

Figure 1:
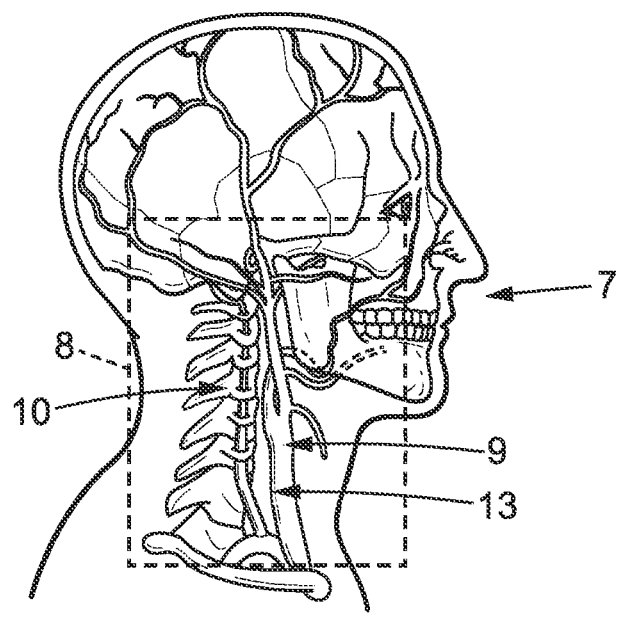
FIG. 1 illustrates an object with an internal element of interest, an additional portion and an imaged region.

The simulation device 2 according to the invention is illustrated on FIG. 5, while FIG. 1 illustrates the internal element of interest 9 and the additional portion 10 of the living tissue.

As is can be seen on FIG. 5, the simulation device 2 reproduces the topology of the internal element of interest 9 but not a topology of said additional portion 10 of the living tissue.

The materials of the simulation device 2 are such that, a deformed configuration of the simulation device 2 under said second set of predefined loads and constraints is similar to a deformed configuration of the organ or part of an organ surrounded by said additional portion 10 of the living tissue under said first set of predefined loads and constraints.

To this aim, the simulation device 2 may be produced by:

performing at least one non-destructive measurement of an imaged region 8 located inside a living tissues, said imaged region 8 comprising an organ or a part of an organ of the living tissues, determining, from said at least one non-destructive measurement, a three dimensional model 11 of the imaged region 8 and at least one object material class indicator representative of a material of the object 7 in at least one location of the three dimensional model 11, generating a first volumetric model and a second volumetric model from said three dimensional model, said first and second volumetric models being respectively divided in a plurality of elementary volumetric elements, the first volumetric model 14 being divided into:

an internal element region 16 modeling the internal element of interest 9 of the object 7, and a surrounding region 17 modeling an additional portion 10 of the object 7 surrounding the internal element, the second volumetric model comprising a device region 20 modeling an operational part of the simulation device, each elementary volumetric element of the device region 20 of the second volumetric model being respectively associated with at least one elementary volumetric element of the internal element region of the first volumetric model, assigning to each elementary volumetric element of the first volumetric model 14 intrinsic material properties selected in a database of intrinsic material properties on the basis of the object material class indicator determined from said at least one non-destructive measurement, computing a deformed configuration of the first volumetric model 14 under a first set of predefined loads and constraints on the basis of said assigned intrinsic material properties, assigning to at least one elementary volumetric element of the device region 20 of the second volumetric model a material selected in a database of simulation materials, on the basis of the deformed configuration of the internal element region of the first volumetric model, fabricating the simulation device 2 of the internal element of interest 9 according to the second volumetric model 18 with said assigned materials.

As detailed above, the materials of the simulation device 2 may comprises at least two different 3D printed materials and, optionally, additional non-printable materials such as water, gels, metals, ions, ceramics, bio-molecules and the like.

The simulation device 2 can be integrated in a simulation system 1 of an internal element of interest 9 as illustrated on FIG. 5.

Such a simulation system 1 comprises, in addition to the simulation device 2, a physical support 5 with a slot 6.

The physical support 5 may reproduce a general topology of the surroundings of the internal element, for example reproduce the topology of an arm if the internal element is a portion of a wrist.

However, the mechanical behavior of the physical support 5 does not have to reproduce the mechanical behavior of the surroundings of the internal element.

The physical support 5 is separated from the simulation device and is, in particular, fabricated in a distinct fabrication process. As mentioned above, while the physical support may be simulated as a support region 21 of the second volumetric model, the support region 21 of the second volumetric model is not fabricated during the fabrication step of a method for fabricating a physical simulation device according to the invention.

The material assigned to each elementary volumetric element of the support region 21 during the steps of a method for fabricating a physical simulation device 2 according to the invention is predefined and fixed during the operation of the method.

The physical support 5 may for instance be produced in large quantities. The physical support 5 can be made of a single material. In some embodiments of the invention, the physical support 5 may be produced by an inexpensive process, for instance by molding or casting.

The physical support 5 is provided with at least one slot 6 adapted to accommodate the simulation device 2 as illustrated on FIG. 5.

Eventually, another object of the invention is an apparatus 100 for fabricating a physical simulation device 2 of an internal element of interest 9 located inside an object 7 according to a method as detail above.

Figure 6:
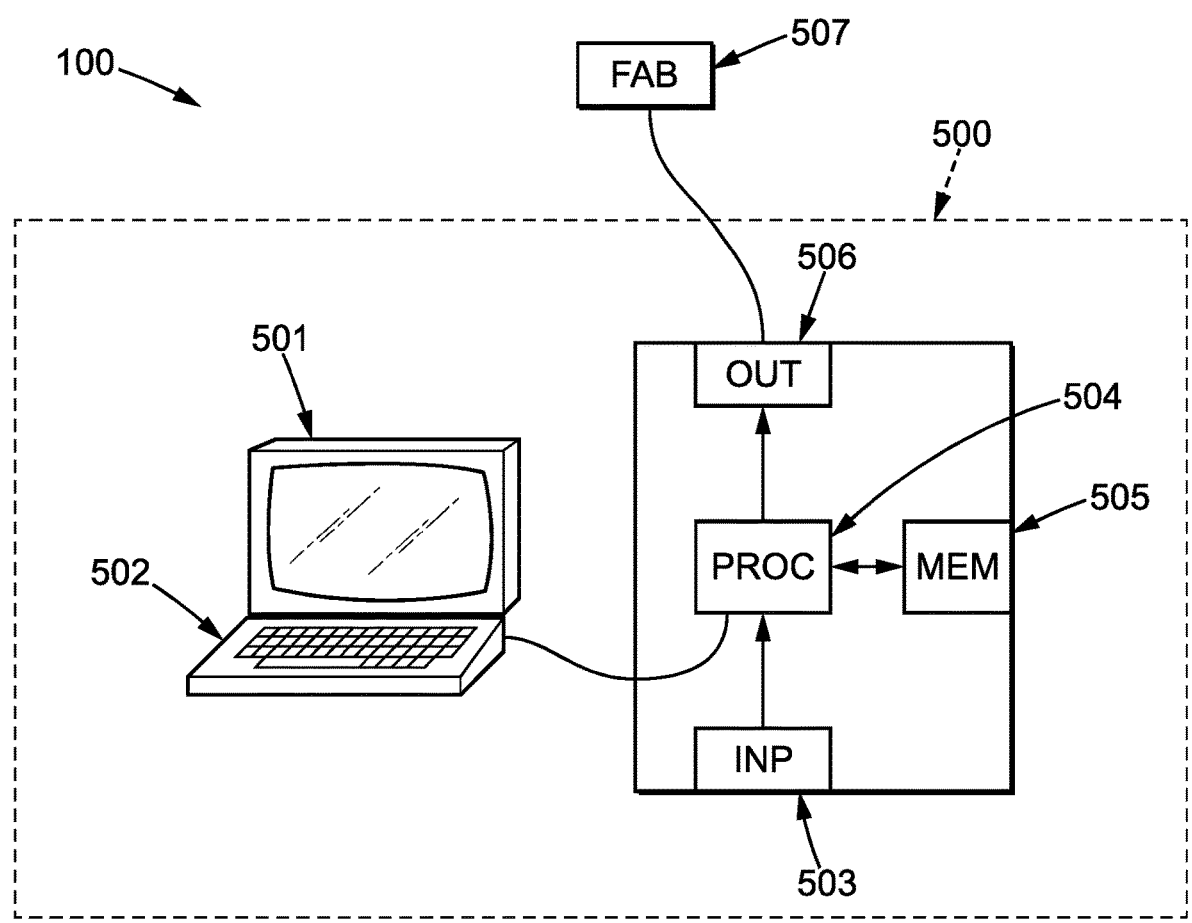
FIG. 6 illustrates an apparatus for fabricating a physical simulation device according to an embodiment of the invention.

Such an apparatus 100 is illustrated on FIG. 6 and comprises:

a communication unit 503 operative to receive at least one non-destructive measurement of an imaged region 8 located inside an object 7, said imaged region 8 comprising an internal element of interest 9 of the object 7, a memory unit operative to store a database of intrinsic material properties and a database of simulation materials, a processing unit operative to determine, from said at least one non-destructive measurement, a three dimensional model 11 of the imaged region 8 and at least one object material class indicator representative of a material of the object 7 in at least one location of the three dimensional model 11, generate a first volumetric model 14 and a second volumetric model 18 from said three dimensional model 11, said first and second volumetric models 18 being respectively divided in a plurality of elementary volumetric elements, assign to each elementary volumetric element of the first volumetric model 14 intrinsic material properties selected in the database of intrinsic material properties on the basis of the object material class indicator determined from said at least one non-destructive measurement, compute a deformed configuration of the first volumetric model 14 under a first set of predefined loads and constraints on the basis of said assigned intrinsic material properties, assign to at least one elementary volumetric element of the second volumetric model a material selected in the database of simulation materials, on the basis of the deformed configuration of the first volumetric model 14, and a fabrication unit 507 operative to fabricate a simulation device 2 of the internal element of interest 9 according to the second volumetric model 18 with said assigned materials.

The communication unit 503, memory unit 505 and processing unit 504 may be part of a control unit 500, for instance a computer.

The memory unit 505 may be further able to store program instructions loadable into the processing unit 504 and adapted to cause processing unit 504 to carry out the steps of the present invention when the program instructions are run by the processing unit 504.

The processing unit 504 may be a circuit, for instance:

a processor or a processing unit adapted to interpret instructions in a computer language, the processor or the processing unit may comprise, may be associated with or be attached to a memory comprising the instructions, or the association of a processor/processing unit 504 and a memory, the processor or the processing unit 504 adapted to interpret instructions in a computer language, the memory comprising said instructions, or an electronic card wherein the steps of the invention are described within silicon, or a programmable electronic chip such as a FPGA chip (for «Field-Programmable Gate Array»).

The control unit 500 may also comprise an interface 506 for controlling the fabrication unit 507.

The fabrication unit 507 may comprise a 3D printer as detailed above.

To ease the interaction with the computer, a screen 501 and a keyboard 502 may be provided and connected to the control unit 500.

Although many embodiments have been described in reference to fabricating a model of a body part, body organ or part of an organ, the embodiments of the present invention are not limited in that respect and that the same system and methods can be used for fabricating simulating devices of other internal elements.

The terms "comprises", "comprising", "includes", "including", "having" and their conjugates mean "including but not limited to". The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The invention claimed is:

1. An organ simulation device configured to simulate a portion of an in vivo organ and additional portions of a body surrounding the in vivo organ portion, the organ simulation device comprising:
   an organ replica having an internal surface topology and an external surface topology, the organ replica being formed from a plurality of materials, the plurality of materials having different respective intrinsic material properties, wherein:
   the internal surface topology of the organ replica replicates the internal surface topology of the in vivo organ portion;
   the external surface topology does not match the external surface topology of the in vivo organ portion or the external topology of the surrounding body portions; and
   the materials of the organ replica are selected and arranged to such that the mechanical behavior of the organ replica in a deformed configuration substantially matches the mechanical behavior of the in-vivo organ portion surrounded by the surrounding body portions.

2. The organ simulation device of claim 1, further comprising:
   a device interface, wherein the device interface has a topology that is different from a topology of replicated organ portion or any of the surrounding body portions, and the device interface provides an interface between the organ replica and a physical support for the organ replica.

3. The organ simulation device of claim 1, wherein the deformed configuration comprises a configuration resulting from the application of predefined loads to the interior surface of the organ replica.

4. The organ simulation device of claim 1, wherein the predefined loads correspond to a stress field associated with the introduction of a catheter into the organ portion.

5. The organ simulation device of claim 4, wherein the predefined loads further correspond to the stress field associated with an introduction of a stent into the organ portion.

6. The organ simulation device of claim 5, wherein the organ portion comprises a portion of an artery.

7. The organ simulation device of claim 6, wherein the artery comprises the carotid artery.

8. The organ simulation device of claim 1, wherein the mechanical behavior of the organ replica in the deformed configuration includes the simulation of a plurality of mechanical constraints associated with the combined mechanical response of the in vivo organ portion and the surrounding body portions.

9. The organ simulation device of claim 1, wherein the surrounding portions comprise at least one of tissue, bone, or joint that provide mechanical feedback on the internal surface of the in vivo body portion.

10. The organ simulation device of claim 1, wherein the surrounding portions comprise an additional portion of the replicated organ portion beyond that for which the interior surface topology is replicated.

11. The organ simulation device of claim 1 wherein the plurality of materials of the organ replica are arranged as plurality of voxels deposited according to an additive manufacturing process.

12. A method of manufacturing the organ simulation device of claim 1, comprising:
    receiving at an additive manufacturing device at least one computer readable data file corresponding to the organ replica, the at least one computer readable data file including an 3D arrangement of voxels, each voxel being associated with at least one of a plurality of 3D printable materials;
    printing, using the additive manufacturing device and the received at least one computer readable data file the organ replica.

13. The method of claim 12, further comprising coupling the organ replica to a physical support structure at a device interface of the organ simulation device.

14. The method of claim 12, further comprising generating the at least one computer readable data file.

15. The method of claim 14, wherein generating the at least one computer readable data file comprises capturing an image of the in vivo organ portion and surrounding body portions.

16. The method of claim 14, wherein generating the at least one computer readable data file further comprises:
    generating a volumetric model of the in vivo body portion and surrounding body portions, wherein the volumetric model includes a plurality of voxels, and assigning one of the 3D printable materials to each of the voxels of the second volumetric model using an iterative cost function minimization process.

17. The method of claim 16, further comprising converting the volumetric model to the at least one computer readable data file.

18. The method of claim 12, wherein the organ simulation device is unitarily formed.

19. The organ simulation device of claim 1, wherein the organ simulation device is unitarily formed.

20. The organ simulation device of claim 1, wherein the organ simulation device is formed of 3D arrangement of voxels, each voxel being associated with at least one of a plurality of 3D printable materials.

* * * * *